US00RE45574E

(19) United States
(12) Reissued Patent
Harter

(10) Patent Number: US RE45,574 E
(45) Date of Reissued Patent: Jun. 23, 2015

(54) SELF-PROGRAMMABLE THERMOSTAT

(75) Inventor: Robert J. Harter, La Crosse, WI (US)

(73) Assignee: Honeywell International Inc., Morristown, NJ (US)

(21) Appl. No.: 13/551,543

(22) Filed: Jul. 17, 2012

Related U.S. Patent Documents

Reissue of:
(64) Patent No.: 7,784,704
Issued: Aug. 31, 2010
Appl. No.: 11/704,414
Filed: Feb. 9, 2007

(51) Int. Cl.
*G05D 23/32* (2006.01)
*F24F 11/00* (2006.01)
*G05D 23/00* (2006.01)

(52) U.S. Cl.
CPC ..... *F24F 11/00* (2013.01); *F24F 2011/0063* (2013.01); *F24F 2011/0065* (2013.01); *F24F 2011/0064* (2013.01)

(58) Field of Classification Search
USPC ..... 236/46 R, 46 C, 1 C, 44 C
See application file for complete search history.

(56) References Cited

U.S. PATENT DOCUMENTS 2,202,008 A 5/1940 Ittner
4,032,867 A 6/1977 Engeler et al.
(Continued)

FOREIGN PATENT DOCUMENTS

CA 2202008 A1 10/1998
EP 0196069 A2 10/1986
(Continued)

OTHER PUBLICATIONS

Erickson, et al. "Energy Efficient Building Environment Control Strategies Using Real-Time Occupancy Measurement," ACM Workshop on Embedded Sensing Systems for Energy Efficiency in Buildings, 2009, pp. 19-24.
(Continued)

*Primary Examiner* — Ljiljana Ciric
*Assistant Examiner* — Alexis Cox
(74) *Attorney, Agent, or Firm* — Seager Tufte & Wickhem LLC

(57) ABSTRACT

A hybrid manual/programmable thermostat for a furnace or air conditioner [offers the simplicity of a manual thermostat while providing the convenience and versatility of a programmable one. Initially, the hybrid thermostat appears to function as an ordinary manual thermostat; however, it privately observes and learns] *that is configured to learn from* a user's manual temperature [setting habits] *settings* and [eventually programs] *program* itself accordingly. [If users begin changing their preferred temperature settings due to seasonal changes or other reasons, the thermostat continues learning] *The thermostat may be configured to learn* and [will] adapt to [those changes as well. For ease of use, the thermostat does not require an onscreen menu as a user interface. In some embodiments, the thermostat can effectively program itself for temperature settings that are set to occur at particular times daily or just on weekends, yet the user is not required to enter the time of day or the day of the week] *a user's manual temperature settings over time*.

17 Claims, 3 Drawing Sheets

(56) References Cited

U.S. PATENT DOCUMENTS 4,223,831 A 9/1980 Szarka
4,316,577 A 2/1982 Adams et al.
4,335,847 A * 6/1982 Levine ..... 236/46 R
4,350,966 A 9/1982 Nelson
4,408,711 A 10/1983 Levine
4,467,178 A * 8/1984 Swindle ..... 392/449
4,469,274 A * 9/1984 Levine ..... 236/46 R
4,531,064 A * 7/1985 Levine ..... 307/66
4,595,430 A 6/1986 Baker
4,615,380 A 10/1986 Beckey
4,621,336 A 11/1986 Brown
4,669,654 A 6/1987 Levine et al.
4,674,027 A 6/1987 Beckey
4,685,614 A 8/1987 Levine
4,751,961 A 6/1988 Levine et al.
4,768,706 A 9/1988 Parfitt
5,005,365 A 4/1991 Lynch
5,056,712 A * 10/1991 Enck ..... 236/20 R
5,088,645 A * 2/1992 Bell ..... 236/46 R
5,115,967 A * 5/1992 Wedekind ..... 236/46 R
5,165,465 A * 11/1992 Kenet ..... 165/11.1
5,170,935 A * 12/1992 Federspiel et al. ..... 236/44 C
5,192,020 A 3/1993 Shah
5,192,874 A 3/1993 Adams
5,211,332 A 5/1993 Adams
5,224,649 A 7/1993 Brown
5,238,184 A 8/1993 Adams
5,240,178 A 8/1993 Dewolf et al.
5,255,975 A 10/1993 Adams
5,270,952 A 12/1993 Adams et al.
5,294,047 A 3/1994 Schwer
5,303,612 A 4/1994 Odom et al.
5,361,983 A 11/1994 Bird
5,395,042 A 3/1995 Riley et al.
5,476,221 A 12/1995 Seymour et al.
5,482,209 A 1/1996 Cochran et al.
5,485,954 A 1/1996 Guy et al.
5,499,196 A 3/1996 Pacheco
5,555,927 A 9/1996 Shah
5,603,451 A 2/1997 Helander et al.
5,611,484 A 3/1997 Uhrich
5,627,531 A 5/1997 Posso et al.
5,673,850 A 10/1997 Uptegraph et al.
5,690,277 A 11/1997 Flood
5,720,176 A 2/1998 Manson et al.
5,808,602 A 9/1998 Sellers et al.
5,902,183 A 5/1999 D'Souza
5,909,378 A 6/1999 De Milleville et al.
5,931,378 A 8/1999 Schramm et al.
5,943,917 A 8/1999 Truong et al.
5,977,964 A 11/1999 Williams et al.
6,062,482 A 5/2000 Gauthier et al.
6,098,893 A 8/2000 Berglund et al.
6,164,374 A 12/2000 Rhodes et al.
6,206,295 B1 3/2001 LaCoste
6,209,794 B1 4/2001 Webster et al.
6,211,921 B1 4/2001 Cherian et al.
6,213,404 B1 4/2001 Dushane et al.
6,216,956 B1 4/2001 Ehlers et al.
6,222,191 B1 4/2001 Myron et al.
6,286,764 B1 9/2001 Garvey et al.
6,298,285 B1 10/2001 Addink et al.
6,349,883 B1 2/2002 Simmons et al.
6,351,693 B1 2/2002 Monie et al.
6,356,204 B1 3/2002 Guindi et al.
6,375,087 B1 4/2002 Day et al.
6,453,687 B2 9/2002 Sharood et al.
6,502,758 B2 1/2003 Cottrell
6,519,509 B1 2/2003 Nierlich et al.
6,636,197 B1 10/2003 Goldenberg et al.
6,641,055 B1 11/2003 Tiernan
6,644,557 B1 11/2003 Jacobs
6,645,066 B2 11/2003 Gutta et al.
6,726,112 B1 4/2004 Ho
6,741,158 B2 5/2004 Engler et al.
6,769,482 B2 8/2004 Wagner et al.
6,814,299 B1 11/2004 Carey
6,824,069 B2 11/2004 Rosen
6,851,621 B1 2/2005 Wacker
D506,150 S 6/2005 Backlund et al.
D506,689 S 6/2005 Backlund et al.
6,951,306 B2 10/2005 DeLuca
7,000,849 B2 2/2006 Ashworth et al.
7,014,336 B1 3/2006 Ducharme et al.
7,024,336 B2 4/2006 Salsbury
7,028,912 B1 4/2006 Rosen
7,035,805 B1 4/2006 Miller
7,055,759 B2 6/2006 Wacker et al.
7,083,109 B2 8/2006 Pouchak
7,108,194 B1 9/2006 Hankins, II
7,109,970 B1 9/2006 Miller
7,111,788 B2 9/2006 Reponen
7,114,554 B2 10/2006 Bergman et al.
7,117,129 B1 10/2006 Bash et al.
7,140,551 B2 11/2006 de Pauw et al.
7,141,748 B2 11/2006 Tanaka et al.
7,142,948 B2 11/2006 Metz
7,146,348 B2 12/2006 Geib et al.
7,152,806 B1 12/2006 Rosen
7,156,318 B1 1/2007 Rosen
7,159,789 B2 1/2007 Schwendinger et al.
7,159,790 B2 1/2007 Schwendinger et al.
7,181,317 B2 2/2007 Amundson et al.
7,222,494 B2 5/2007 Peterson et al.
7,222,800 B2 5/2007 Wruck
7,225,054 B2 5/2007 Amundson et al.
7,258,280 B2 8/2007 Wolfson
7,264,175 B2 9/2007 Schwendinger et al.
7,274,972 B2 9/2007 Amundson et al.
7,287,709 B2 10/2007 Proffitt et al.
7,299,996 B2 11/2007 Garrett et al.
7,302,642 B2 11/2007 Smith et al.
7,333,880 B2 2/2008 Brewster et al.
7,379,997 B2 5/2008 Ehlers et al.
RE40,437 E 7/2008 Rosen
7,434,742 B2 10/2008 Mueller et al.
7,451,937 B2 11/2008 Flood et al.
7,455,240 B2 11/2008 Chapman, Jr. et al.
7,469,550 B2 12/2008 Chapman, Jr. et al.
7,509,753 B2 3/2009 Nicosia et al.
7,552,030 B2 6/2009 Guralnik et al.
7,558,648 B2 7/2009 Hoglund et al.
7,584,899 B2 9/2009 de Pauw et al.
7,596,431 B1 9/2009 Forman et al.
7,600,694 B2 10/2009 Helt et al.
7,614,567 B2 11/2009 Chapman, Jr. et al.
7,624,931 B2 12/2009 Chapman, Jr. et al.
7,634,504 B2 12/2009 Amundson
7,641,126 B2 1/2010 Schultz et al.
7,643,908 B2 1/2010 Quirino et al.
7,644,869 B2 1/2010 Hoglund et al.
7,667,163 B2 2/2010 Ashworth et al.
7,693,582 B2 4/2010 Bergman et al.
7,702,424 B2 4/2010 Cannon et al.
7,703,694 B2 4/2010 Mueller et al.
7,778,734 B2 8/2010 Oswald et al.
7,784,291 B2 8/2010 Butler et al.
7,784,704 B2 8/2010 Harter
7,802,618 B2 9/2010 Simon et al.
7,845,576 B2 12/2010 Siddaramanna et al.
7,848,900 B2 12/2010 Steinberg et al.
7,854,389 B2 12/2010 Ahmed
7,904,830 B2 3/2011 Hoglund et al.
7,913,825 B2 3/2011 Boyer
7,949,615 B2 5/2011 Ehlers et al.
8,010,237 B2 8/2011 Cheung et al.
8,019,567 B2 9/2011 Steinberg et al.
8,042,048 B2 10/2011 Wilson et al.
8,063,775 B2 11/2011 Reed et al.
8,078,330 B2 12/2011 Brickfield et al.
8,090,477 B1 1/2012 Steinberg
8,131,497 B2 3/2012 Steinberg et al.
8,180,492 B2 5/2012 Steinberg
8,219,250 B2 7/2012 Dempster et al.

(56) References Cited

U.S. PATENT DOCUMENTS

| | | | |
|---|---|---|---|
| 8,239,922 | B2 | 8/2012 | Sullivan et al. |
| 8,280,536 | B1 | 10/2012 | Fadell et al. |
| 8,442,695 | B2 | 5/2013 | Imes et al. |
| 8,452,457 | B2 | 5/2013 | Matsuoka et al. |
| 8,510,255 | B2 | 8/2013 | Fadell et al. |
| 2002/0005435 | A1 | 1/2002 | Cottrell |
| 2003/0034898 | A1 | 2/2003 | Shamoon et al. |
| 2003/0040842 | A1 | 2/2003 | Poth |
| 2003/0042320 | A1 | 3/2003 | Decker |
| 2004/0027271 | A1 | 2/2004 | Schuster et al. |
| 2004/0034484 | A1 | 2/2004 | Solomita, Jr. et al. |
| 2004/0055446 | A1 | 3/2004 | Robbin et al. |
| 2004/0149478 | A1 | 8/2004 | Staiger |
| 2004/0249479 | A1 | 12/2004 | Shorrock |
| 2004/0256472 | A1 | 12/2004 | DeLuca |
| 2004/0260427 | A1 | 12/2004 | Wimsatt |
| 2004/0262410 | A1 | 12/2004 | Hull |
| 2005/0040247 | A1 | 2/2005 | Pouchak |
| 2005/0119766 | A1 | 6/2005 | Amundson et al. |
| 2005/0128067 | A1 | 6/2005 | Zakrewski |
| 2005/0189429 | A1 | 9/2005 | Breeden |
| 2005/0204997 | A1 | 9/2005 | Fournier |
| 2005/0280421 | A1 | 12/2005 | Yomoda |
| 2006/0079983 | A1 | 4/2006 | Willis |
| 2006/0186214 | A1 | 8/2006 | Simon et al. |
| 2006/0196953 | A1 | 9/2006 | Simon et al. |
| 2007/0045430 | A1 | 3/2007 | Chapman et al. |
| 2007/0045433 | A1 | 3/2007 | Chapman et al. |
| 2007/0045444 | A1 | 3/2007 | Gray |
| 2007/0050732 | A1 | 3/2007 | Chapman |
| 2007/0057079 | A1 | 3/2007 | Stark |
| 2007/0158442 | A1 | 7/2007 | Chapman et al. |
| 2007/0158444 | A1 | 7/2007 | Naujok et al. |
| 2007/0173978 | A1 | 7/2007 | Fein |
| 2007/0225867 | A1 | 9/2007 | Moorer et al. |
| 2007/0227721 | A1 | 10/2007 | Springer et al. |
| 2007/0228183 | A1 | 10/2007 | Kennedy et al. |
| 2007/0241203 | A1 | 10/2007 | Wagner et al. |
| 2007/0257120 | A1 | 11/2007 | Chapman et al. |
| 2007/0278320 | A1 | 12/2007 | Lunacek et al. |
| 2008/0006709 | A1 | 1/2008 | Ashworth et al. |
| 2008/0015742 | A1 | 1/2008 | Kulyk et al. |
| 2008/0054082 | A1 | 3/2008 | Evans et al. |
| 2008/0191045 | A1 | 8/2008 | Harter |
| 2008/0219227 | A1 | 9/2008 | Michaelis |
| 2008/0223136 | A1 | 9/2008 | Yakabe et al. |
| 2008/0245480 | A1 | 10/2008 | Knight et al. |
| 2008/0290183 | A1 | 11/2008 | Laberge et al. |
| 2008/0317292 | A1 | 12/2008 | Baker et al. |
| 2009/0001180 | A1 | 1/2009 | Siddaramanna et al. |
| 2009/0057424 | A1 | 3/2009 | Sullivan et al. |
| 2009/0112335 | A1 | 4/2009 | Mehta et al. |
| 2009/0140056 | A1 | 6/2009 | Leen |
| 2009/0140057 | A1 | 6/2009 | Leen |
| 2009/0143916 | A1 | 6/2009 | Boll et al. |
| 2009/0171862 | A1 | 7/2009 | Harrod et al. |
| 2009/0195349 | A1 | 8/2009 | Frader-Thompson et al. |
| 2009/0215534 | A1 | 8/2009 | Wilson et al. |
| 2009/0216380 | A1 | 8/2009 | Kolk |
| 2009/0254225 | A1 | 10/2009 | Boucher et al. |
| 2009/0259713 | A1 | 10/2009 | Blumrich et al. |
| 2009/0271042 | A1 | 10/2009 | Voysey |
| 2009/0283603 | A1 | 11/2009 | Peterson et al. |
| 2009/0312999 | A1 | 12/2009 | Kasztenny et al. |
| 2010/0019051 | A1 | 1/2010 | Rosen |
| 2010/0025483 | A1* | 2/2010 | Hoeynck et al. ..... 236/1 C |
| 2010/0026229 | A1 | 2/2010 | Williams |
| 2010/0052576 | A1 | 3/2010 | Steiner et al. |
| 2010/0070084 | A1 | 3/2010 | Steinberg et al. |
| 2010/0070085 | A1 | 3/2010 | Harrod et al. |
| 2010/0070086 | A1 | 3/2010 | Harrod et al. |
| 2010/0070089 | A1 | 3/2010 | Harrod et al. |
| 2010/0070096 | A1 | 3/2010 | Rauscher et al. |
| 2010/0070234 | A1 | 3/2010 | Steinberg et al. |
| 2010/0070907 | A1 | 3/2010 | Harrod et al. |
| 2010/0084482 | A1 | 4/2010 | Kennedy et al. |
| 2010/0106305 | A1 | 4/2010 | Pavlak et al. |
| 2010/0107070 | A1 | 4/2010 | Devineni et al. |
| 2010/0107076 | A1 | 4/2010 | Grohman et al. |
| 2010/0198425 | A1 | 8/2010 | Donovan |
| 2010/0211224 | A1 | 8/2010 | Keeling et al. |
| 2010/0262298 | A1 | 10/2010 | Johnson et al. |
| 2010/0262299 | A1 | 10/2010 | Cheung et al. |
| 2010/0280667 | A1 | 11/2010 | Steinberg |
| 2010/0289643 | A1 | 11/2010 | Trundle et al. |
| 2010/0308119 | A1 | 12/2010 | Steinberg et al. |
| 2010/0318227 | A1 | 12/2010 | Steinberg et al. |
| 2010/0324437 | A1 | 12/2010 | Freeman et al. |
| 2010/0327766 | A1 | 12/2010 | Recker et al. |
| 2011/0015798 | A1 | 1/2011 | Golden et al. |
| 2011/0015802 | A1 | 1/2011 | Imes |
| 2011/0035060 | A1 | 2/2011 | Oswald |
| 2011/0046756 | A1 | 2/2011 | Park |
| 2011/0046782 | A1 | 2/2011 | Fixell |
| 2011/0046792 | A1 | 2/2011 | Imes et al. |
| 2011/0046805 | A1 | 2/2011 | Bedros et al. |
| 2011/0046806 | A1 | 2/2011 | Nagel et al. |
| 2011/0054710 | A1 | 3/2011 | Imes et al. |
| 2011/0077896 | A1 | 3/2011 | Steinberg et al. |
| 2011/0153089 | A1 | 6/2011 | Tiemann et al. |
| 2011/0173542 | A1 | 7/2011 | Imes et al. |
| 2011/0185895 | A1 | 8/2011 | Freen |
| 2011/0196539 | A1 | 8/2011 | Nair et al. |
| 2011/0224838 | A1 | 9/2011 | Imes et al. |
| 2011/0288905 | A1 | 11/2011 | Mrakas |
| 2011/0307103 | A1 | 12/2011 | Cheung et al. |
| 2012/0065935 | A1 | 3/2012 | Steinberg et al. |
| 2012/0066168 | A1 | 3/2012 | Fadell et al. |
| 2012/0085831 | A1 | 4/2012 | Kopp |
| 2012/0131504 | A1 | 5/2012 | Fadell et al. |
| 2012/0158350 | A1 | 6/2012 | Steinberg et al. |
| 2012/0165993 | A1 | 6/2012 | Whitehouse |
| 2012/0221151 | A1 | 8/2012 | Steinberg |
| 2012/0245740 | A1 | 9/2012 | Raestik et al. |
| 2013/0103622 | A1 | 4/2013 | Matsuoka et al. |
| 2013/0274928 | A1 | 10/2013 | Matsuoka et al. |

FOREIGN PATENT DOCUMENTS

| | | |
|---|---|---|
| JP | S59-106311 | 6/1984 |
| JP | H1-252850 | 10/1989 |
| WO | 2011072332 A1 | 6/2011 |

OTHER PUBLICATIONS

Allen, R., et al., "Real-Time Earthquake Detection and Hazard Assessment by Alarms Across California," Geophysical Research Letters, vol. 36, L00B08, pp. 1-6, 2009.

Honeywell, "Prestige Product Data," Honeywell Internaitonal Inc., 2012, 126 pages.

Nordman, B., et al., "Using Existing Networks for Energy Purposes," In Proceesing of the First ACM Workshop on Embedded Sensing Systems for Energy-Efficiency in Buildings, ACM, 2009, 2 pages.

Cisco Systems, White Paper, "Wi-Fi Based Real-Time Location Tracking: Solutions and Technology," Cisco Systems, Inc., 2006, 6 pages.

White Rodgers Model 1F81-261 Installation and Operatinf Instructions, White-Rodgers, Emerson Electric Co., 2010, 8 pages.

Mozer, M., et al., "The Neurothermostat: Predictive Optimal Control of Residential Heating Systems," Adv. In Neural Info. Proc. Systems 9, pp. 953-959, Cambrdige, MA MIT Press, 1997.

Scott, J., et al., "PreHeat: Controlling Home Heating Using Occupancy Prediction," In Proceedings of the 13th International Conference on Ubiquitous Computing, pp. 281-291, ACM, 2011.

Melfi, R., et al., "Measuring Building Occupancy Using Existing Network Infrastructure," In Green Computing Conference and Workships (IGCC), 2011 International, pp. 1-8, IEEE, 2011.

Akhlaghinia, M., et al., "Occupancy Monitoring in Intelligent Environment Through Integrated Wireless Localizing Agents," In 2009 IEEE Symposium on intelligent Agetns, Piscataway, NJ, USA, vol. 30, 2009, 7 pages.

(56) References Cited

OTHER PUBLICATIONS

Aprilaire Electronic Thermostats, "User's Manual Installation and Programming," Dec. 2000.
Braeburn, "Premier Series Programmable Thermostats," pp. 1-20, 2011.
Braeburn, "Premier Series Universal Auto Changeover 5300," pp. 1-15, 2009.
Carrier, "SYSTXCCUIZ01-V Infinity Control Installation Instructions," pp. 1-20, 2012.
Carrier, "TB-PAC TB-PHP Base Series Programmable Thermostats Installation Instructions," 8 pages, 2012.
Davis, Gray, "Buildings End-Use energy Efficiency; Alternatives to Compressor Cooling," California Energy Commission, 80 pages, Jan. 2000.
Deleeuw, Scott., "Ecobee WiFi enabled Smart Thermostat Part 2: The Features review," pp. 1-7, Dec. 2, 2011.
Ecobee, "Smart Si Thermostat User Manual," 44 pages, 2012. EB-SmartSiUM-01rev1.
Ecobee, "Smart Thermostat User's Manual," 20 pages, 2010. UM-STAT-106-R4.
Fountain, M. et al., "Comfort control for short-term occupancy," Center for the Built Environment, UC Berkeley, 15 pages, Publicized Jan. 14, 1994.
Goa, Ge et al., "The Self-Programming Thermostat: Optimizing Setback Schedules based on Home Occupancy Patterns," BuildSys—09, 6 pages, Nov. 3, 2009.
Honeywell, "Installation Guide VisionPRO TH8000 Series," pp. 1-11, 2012. 69-2693-01.
Honeywell, "Operating Manual FocusPRO TH6000 Series," pp. 1-24, 2011. 69-1921EFS-03.
Honeywell, "Perfect Climate Comfort Center control systems," pp. 1-44, 2001. 68-0173-3.
Honeywell, "T8611G Chronotherm IV Deluxe Programmable Heat Pump Thermostat Installation Instructions," pp. 1-24, 1997. 69-1406-1.
Honeywell, "THX9321 Prestige 2.0 and THX9421 Prestige IAQ 2.0 with EIM," 160 pages, 2012. 68-0311-02.
Lennox, "homeowner's manual ConfortSense 5000 Series."
Lennox, "Homeowner's Manual icomfort Touch Thermostat," pp. 1-20, Dec. 2010. 506053-01.
Lennox, "Owner's Guide, ComfortSense 5000 Series Models L5711U and L5732U Programmable Touch Screen Thermostats," p. 1-32, Feb. 2008. 506067-01.
Lu, Jiakang et al., "The Smart Thermostat: Using Occupancy Sensors to Save Energy in Homes," 14 pages, SenSys '10, Nov. 3-5, 2010.
LuxPro, "Instruction Manual LuxPro PSPU732T." 48 pages, Before 2013. PSPU732T Manual.
Network Thermostat, "Nex/X WiFi Thermostat," 2 pages, 2013.
Robertshaw, "9620 Digital Programmable Thermostat User's Manual," pp. 1-14, 2001. 110-732E.
Robertshaw, "9801i2, 9825i2 Deluxe Programmable Thermostats," pp. 1-36, Jul. 17, 2006.
Trane, "ComfortLink II Installation Guide", pp. 1-20, Mar. 2011. 18-HD64D1-1.
Trane, "TCONT600AF11MA Programmable Comfort Control, Installation Instructions," pp. 1-14, 2006. Pub. No. 18-HD25D20-3.
Trane, "Trane communicating Thermostats for Fan Coil Control, User Guide," pp. 1-32, May 2011. BAS-SVU12A-EN.
Trane, "Trane communicating Thermostats for Heat Pump Control," pp. 1-32, May 2011. BAS-SVU10A-EN.
Venstar, "Residential Thermostat T5800 Owner's Manual and Installation Instructions", Revision 5b, 63 pages, before 2013. P/N88-860.
Washington State University Extension Energy Program, "Electric Heat Lock Out on Heat Pumps," pp. 1-3, Apr. 2010.
White Rodgers, "Emerson Blue Wireless Comfort Interface 1F98EZ-1621," Emerson Climate Technologies, 28 pages, before 2013. Part No. 37/7236-A.
Bay Controls LLC. "Bayweb Thermostat Model BW-WT2 Owner's Manual," Revision 1.8, 31 pages. Nov 2, 2011. Document # BW-WT4-2DOC.
Honeywell, "CT8775A,C The Digital Round(™) Non-Programmable thermostats," Honeywell International Inc. 20 pages, 2004. 69-1676-1.
Mozer, "The Neural Network House: An Environment that Adapts to its Inhabitants," University of Colorado Department of Computer Science. AAA1. pp. 110-114. 1998. AAA1 Techinical Report SS98-02-017.
Mozer, "Lessons from an Adaptive House," University of Colorado Department of Computer Science. 58 pages. http://www.cs.colorado.edu/~mozer/adaptive-house, downloaded Nov. 7, 2011.
"Nest Learning Thermostat Efficiency Simulation White PAper," 22 pages, Oct. 21, 2011. 6 sections.
"Quad Six Magic-Stat(®) Thermostat MS2000 Manual 88-610M_0_001986," 40 pages, 1986. 090051B 88610M.
Ecobee, "Introducing the new Smart Si Thermostat," 7 pages, prior to Jul. 17, 2012.
Ecobee, "Smart Thermostat," 6 pages, 2011.
Lennox, "Homeowner's Manual ComfortSense 5000 Series," 32 pages, Feb. 2008.
Lennox, "Homeowner's Manual ComfortSense 7000 Series," pp. 1-15, May 2009.
Venstar, "Commercial Thermostats T2900, Owner's Manual," pp. 1-26.2, Apr. 2008.
VisionPRO TH8000 Series Installation Guide, Honeywell International Inc., 2012, 12 pages.
VisionPRO Wi-Fi Programmable Thermostat Model TH8320WF, Honeywell Internaitonal Inc., 2012, 48 pages.
Braeburn, "Braeburn Premier Series Programmable Thermostats, Model 5200," 11 pages, 2011.
Braeburn, "Braeburn Premier Series Universal Auto Changeover Up to 3 Heat/2 Cool Heat Pump, or 2 Heat/2 Cool Conventional Thermostat, Model 5300, Installer Guide," 10 pages, 2009.
http://ambientdevices-myshopify.com/products/energy-joule, "Ambient Devices—Energy Joule," 1 page, printed Dec. 4, 2013.
http://www.icy.nl/en/consumer/products/clever-thermostat-pro, "Clever Thermostat Pro-ICY," Overview, 1 page, printed Dec. 4, 2013.
http://ambientdevices.com/about/energy-devices, "Ambient Products," 2 pages, 2013.
Honeywell, "VisionPro TH8000 Series Touchscreen Programmable Thermostat," Operating Manual, 32 pages, 2011.
http://www.icy.nl/en/consumerproducts/clever-thermostat, "The Clever Thermostat—ICY," 1 page, printed Dec. 4, 2013.
http://www.icy.nl/en/consumerproducts/clever-thermostat, "The Clever Thermostat—ICY," Features, 1 page, printed Dec. 4, 2013.
ICY, "ICY Timer Thermostat Connection to District Heating, Honeywell VC8015 en VC8615," 1 page, downloaded Dec. 4, 2013.
"ICY 18xx Timer-Thermostats," User Manual and Installation Guide, 1 page, 2009.
http://www.icy.nl/en/consumerproducts/clever-thermostat, "The Clever Thermostat—ICY," Overview, 1 page, printed Dec. 4, 2013.
http://www.duurzaamthuis.nl/review-slimme-thermostat-icy, "Review Slimme Thermostaat ICY," 5 pages, Feb. 17, 2011.
Network Thermostat, "Network Thermostat RP32-WiFi, Wi-Fi Thermostat," 2 pages, 2012.
Network Thermostat, "Network Thermostat RP32 Universal Programmable Communicating Thermostat, Installation and Programming Instructions," 6 pages, downloaded Dec. 5, 2013.
California Energy Commision, "Buildings End-Use Energy Efficiency, Alternatives to Compressor Cooling," 80 pages, Jan. 2000.

* cited by examiner

SELF-PROGRAMMABLE THERMOSTAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The subject invention generally pertains to a room or building thermostat and more specifically to a method of programming such a thermostat, wherein the thermostat can in effect program itself for various daily and/or weekly temperature setpoints upon learning temperature setting habits of a user and can do such self-programming without ever knowing the actual time of day or day of the week.

BACKGROUND OF RELATED ART

Furnaces, air conditioners and other types of temperature conditioning units typically respond to a thermostat in controlling the air temperature of a room or other area of a building. Currently, thermostats can be classified as manual or programmable.

With manual thermostats, a user manually enters into the thermostat a desired temperature setpoint, and then thermostat controls the temperature conditioning unit to bring the actual room temperature to that setpoint. At various times throughout the day, the user might adjust the setpoint for comfort or to save energy. When operating in a heating mode, for instance, a user might lower the setpoint temperature at night and raise it again in the morning. Although manual thermostats are easy to understand and use, having to repeatedly adjust the setpoint manually can be a nuisance.

Programmable thermostats, on the other hand, can be programmed to automatically adjust the setpoint to predetermined temperatures at specified times. The specified times can initiate automatic setpoint adjustments that occur daily such as on Monday-Friday, or the adjustments might occur weekly on days such as every Saturday or Sunday. For a given day, programmable thermostats can also be programmed to make multiple setpoint adjustments throughout the day, such as at 8:00 AM and 11:00 PM on Saturday or at 6:00 AM and 10 PM on Monday through Friday. Such programming, however, can be confusing as it can involve several steps including: 1) synchronizing the thermostat's clock with the current time of day; 2) entering into the thermostat the current date or day of the week; and 3) entering various chosen days, times and setpoint temperatures. One or more of these steps may need to be repeated in the event of daylight savings time, electrical power interruption, change in user preferences, and various other reasons.

Consequently, there is a need for a thermostat that offers the simplicity of a manual thermostat while providing the convenience and versatility of a programmed thermostat.

SUMMARY OF THE INVENTION

An object of the invention is to provide an essentially self-programmable thermostat for people that do not enjoy programming conventional programmable thermostats.

An object of some embodiments of the invention is to provide a programmable thermostat that does not rely on having to know the time of day, thus a user does not have to enter that.

Another object of some embodiments is to provide a programmable thermostat with both daily and weekly occurring settings, yet the thermostat does not rely on having to know the day of the week, thus a user does not have to enter that.

Another object of some embodiments is to provide a programmable thermostat that does not rely on onscreen menus for programming.

Another object of some embodiments is to provide a thermostat that effectively programs itself as it is being used as a manual thermostat.

Another object of some embodiments is to provide a thermostat that automatically switches from a manual mode to a programmed mode when it recognizes an opportunity to do so.

Another object of some embodiments is to provide a thermostat that automatically switches from a programmed mode to a manual mode simply by manually entering a new desired setpoint temperature.

Another object of some embodiments is to observe and learn the temperature setting habits of a user and automatically program a thermostat accordingly.

Another object of some embodiments is to provide a self-programming thermostat that not only learns a user's temperature setting habits, but if those habits or temperature-setting preferences change over time, the thermostat continues learning and will adapt to the new habits and setpoints as well.

Another object of some embodiments is to minimize the number of inputs and actions from which a user can choose, thereby simplifying the use of a thermostat.

Another object of some embodiments is to provide a thermostat that can effectively self-program virtually an infinite number of setpoint temperatures and times, rather than be limited to a select few number of preprogrammed settings.

Another object of some embodiments is to provide a simple way of clearing programmed settings of a thermostat.

One or more of these and/or other objects of the invention are provided by a thermostat and method that learns the manual temperature setting habits of a user and programs itself accordingly.

DESCRIPTION OF THE PREFERRED EMBODIMENT

Figure 1:
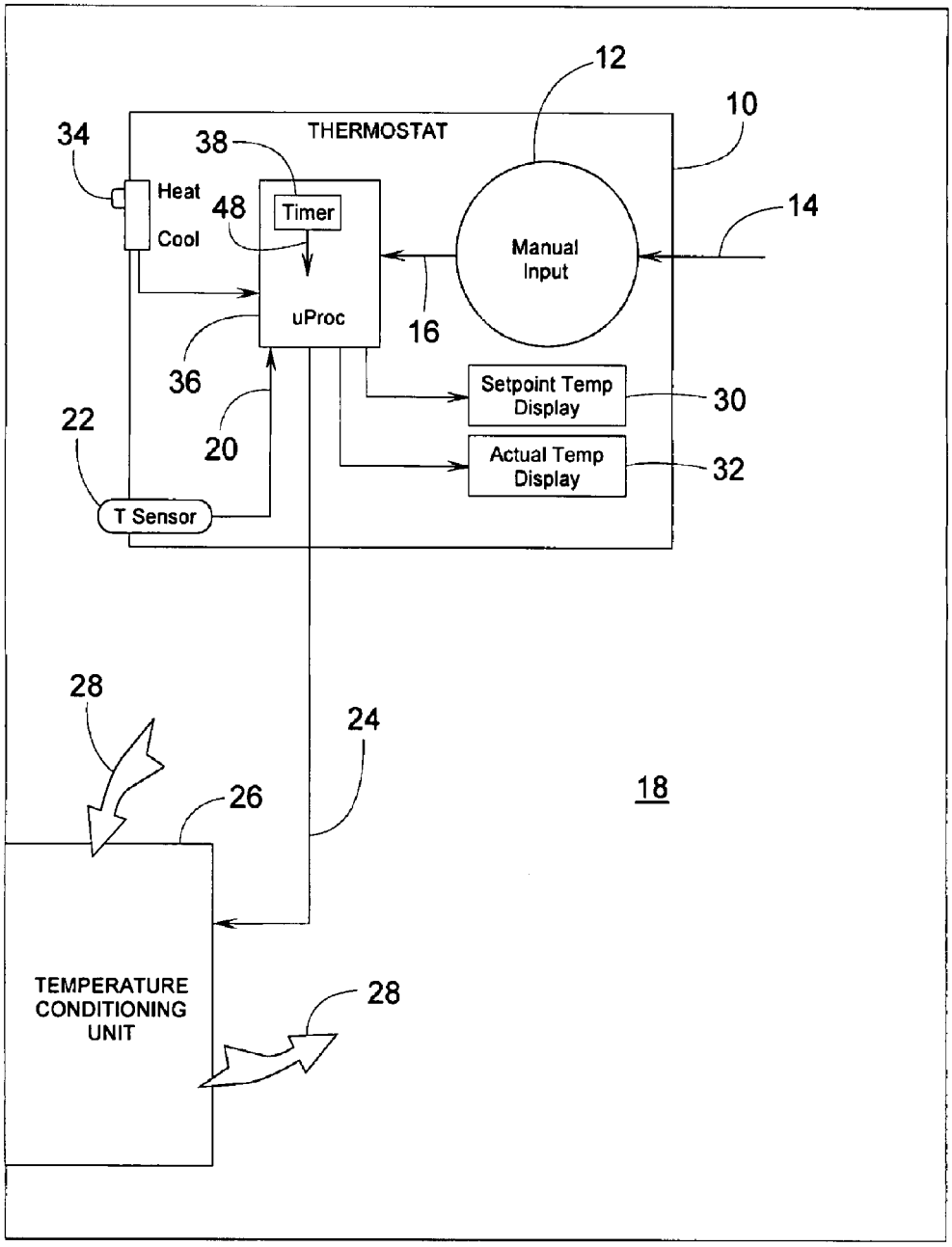
FIG. 1 is a schematic view of a thermostat controlling a temperature conditioning unit.
Figure 2:
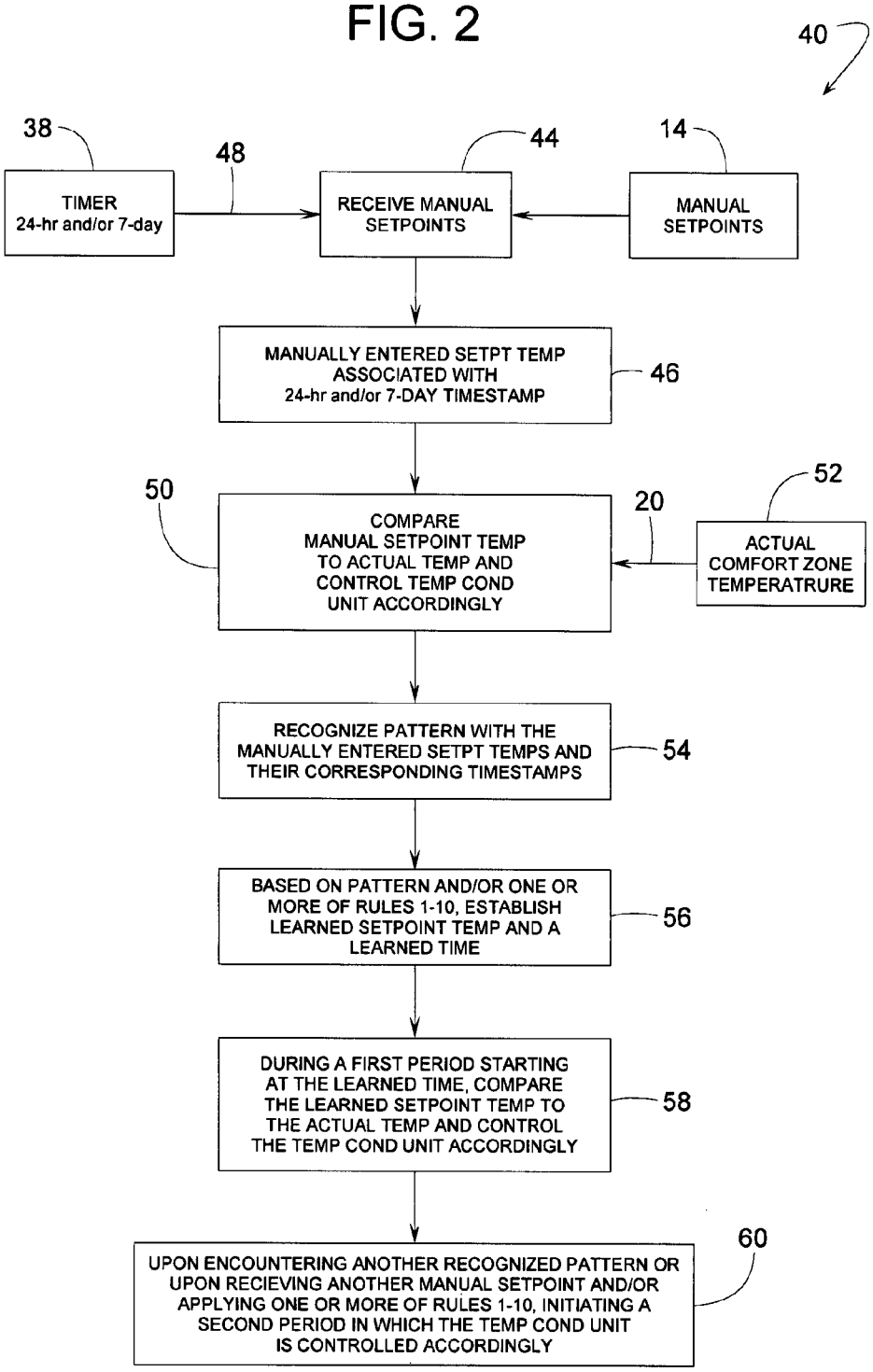
FIG. 2 shows an example of algorithm for a thermostat method.
Figure 3:
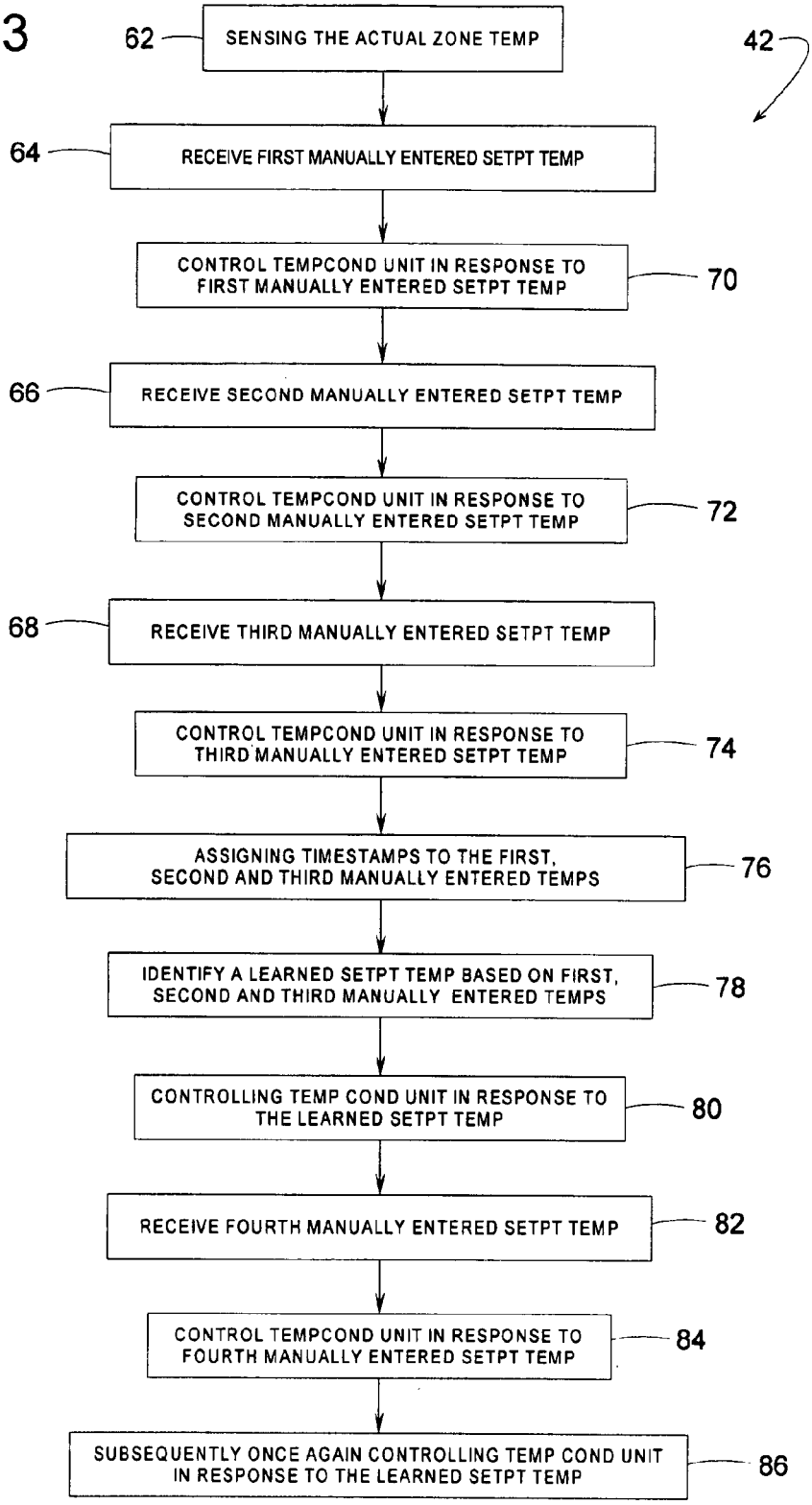
FIG. 3 shows another example of algorithm for a thermostat method.

FIGS. 1-3 show a thermostat 10 and a method for automatically programming it. Initially, thermostat 10 might first appear and function as an ordinary manual thermostat. Thermostat 10, for instance, includes a manual input 12 (e.g., dial, keyboard, pointer, slider, potentiometer, pushbutton, etc.) that enables a user to manually enter a manual setpoint 14 that defines a manually entered setpoint temperature 16. The manually entered setpoint temperature 16 is the user's desired target temperature for a comfort zone 18. Upon comparing the manually entered setpoint temperature 16 to the comfort zone's actual temperature 20 (provided by a temperature sensor 22), thermostat 10 provides an output signal 24 that controls a temperature conditioning unit 26 (e.g., furnace, heater, air conditioner, heat pump, etc.) to heat or cool air 28 in comfort zone 18, thereby urging the comfort zone's actual temperature 20 toward the manually entered setpoint temperature 16.

A digital display 30 can be used for displaying the current setpoint temperature, and another display 32 can show the comfort zone's actual temperature. Displays 30 and 32 could be combined into a single display unit, wherein the combined display unit could show the current setpoint temperature and the zone's actual temperature simultaneously or in an alternating manner. Thermostat 10 might also include a selector switch 34 for manually switching between a cooling mode for cooling zone 18 and a heating mode for heating zone 18. Items such as display 30, selector switch 34, manual input 12, and output 24 are well known to those of ordinary skill in the art. One or more of such items, for example, can be found in a model CT8775C manual thermostat provided by Honeywell Inc. of Golden Valley, Minn.

Although thermostat 10 can operate as a regular manual thermostat by controlling unit 26 as a function of a differential between the actual zone temperature and the most recently entered manual setpoint temperature, thermostat 10 includes a microprocessor 36 (e.g., computer, CPU, firmware programmed chip, etc.) that enables thermostat 10 to observe the temperature setting habits of the user (e.g., person that manually enters setpoint temperatures into the thermostat). After several manual settings, microprocessor 36 may learn the user's preferred setpoint temperatures and timestamps them with the aide of a timer 38. With one or more learned setpoint temperatures and timestamps 48, microprocessor 36 can begin anticipating the user's desires and automatically adjust the thermostat's setpoint temperatures accordingly. Thus, thermostat 10 can begin operating as a programmed thermostat, rather than just a manual one.

Since a user's desired temperature setpoints and time preferences might change for various reasons, any manually entered setpoint temperature 16 overrides the currently active setpoint temperature regardless of whether the current setpoint temperature was manually entered or was automatically activated as a learned setpoint temperature. Once overridden, another learned setpoint temperature might later be activated at a learned time to return thermostat 10 back to its programmed mode. Thus, thermostat 10 is somewhat of a hybrid manual/programmable thermostat in that it can shift automatically between manual and programmed operation.

To assign timestamps 48 to manually entered setpoint temperatures, timer 38 can actually comprise one or more timers and/or counters. In some embodiments, for example, timer 38 includes a continuously running daily or 24-hour timer that resets itself every 24 hours. The time increments can be in minutes, seconds, or any preferred unit. In some cases, timer 38 is a continuously operating weekly or 168-hour timer that resets itself every seven days. The increments can be in days, hours, minutes, seconds, or any preferred unit. The weekly timer could also be a seven-increment counter that indexes one increment every 24 hours in response to a daily or 24-hour timer. Timer 38, however, is not necessarily synchronized with the actual time of day or day of the week. Such synchronization preferably is not required; otherwise the user might have to manually enter or set the correct time and day of the week.

In the case where timer 36 comprises a weekly timer in the form of a 7-increment counter triggered by each 24-hour cycle of a daily timer, timestamp 48 might a be a two-part number such as (X and Y) wherein X cycles from 1 to 7 as a weekly timer, and Y cycles from 0 to 1,439 (1,440 minutes per day) as a daily timer. In this case, a timestamp 48 might be (3 and 700) to indicate 700 minutes elapsed during day-3. Whether day-3 represents Monday, Tuesday or some other day is immaterial, and whether the 700-minute represents 2:00 AM, 7:30 PM or some other time of day is also immaterial. As one way to provide a programmable thermostat that can operate independently of an actual time of day clock and to provide thermostat 10 with other functionality, microprocessor 36 can be firmware programmed to execute one or more of the following rules:

Rule-1—Upon receiving a manually entered setpoint temperature, microprocessor assigns an (X and Y) timestamp 48 to the manually entered setpoint temperature, wherein the timestamp indicates when the setpoint temperature was entered relative to other timestamps. The manually entered setpoint temperature and its timestamp 48 are stored in memory for later reference.

Rule-2—Microprocessor 36 looks for patterns of manual setpoints, wherein each manual setpoint has a manually entered setpoint temperature and a timestamp 48.

A daily pattern, for example, can be defined as three consecutive days in which a series of three similar manually entered setpoint temperatures (e.g., within a predetermined deviation of perhaps 2° F. or 5° F. of each other) have similar daily timestamps 48 (e.g., each Y-value being within a predetermined deviation of perhaps 90 minutes of each other). Such a daily pattern can then be assigned a learned daily setpoint temperature and a learned daily time. The learned daily setpoint temperature could be, for example, an average of the three similar manually entered setpoints temperatures or the most recent of the three. The learned daily time could be, for example, 20 minutes before the three similar timestamps. For future automatic settings, the 20 minutes might allow microprocessor 36 to activate the learned daily setpoint temperature before the user would normally want to adjust the setpoint.

A weekly pattern, for example, can be defined as three manual setpoints spaced 7 days apart (e.g., same X-value after one complete 7-day cycle) in which three similar manually entered setpoint temperatures (e.g., within 2° F. or 5° F. of each other) have similar timestamps 48 (e.g., each Y-value being within 90 minutes of each other). Such a weekly pattern can then be assigned a learned weekly setpoint temperature and a learned weekly time. The learned weekly setpoint temperature could be, for example, an average of the three similar manually entered setpoints temperatures spaced 7 days apart or the most recent of the three. The learned time could be, for example, 20 minutes before the three similar timestamps.

Rule-3—Automatically activate a learned daily setpoint temperature at its learned daily time (at its assigned Y-value), whereby thermostat 10 controls unit 26 based on the learned daily setpoint temperature and continues to do so until interrupted by one of the following: a) the user enters a manually entered setpoint temperature (adjusts the temp), b) another learned daily setpoint temperature becomes activated at its learned daily time, or c) a learned weekly setpoint temperature becomes activated at its learned weekly time.

Rule-4—Automatically activate a learned weekly setpoint temperature at its learned weekly time (at its assigned X and Y values), whereby thermostat 10 controls unit 26 based on the learned weekly setpoint temperature and continues to do so until interrupted by one of the following: a) the user enters a manually entered setpoint temperature (adjusts the temp), b) a learned daily setpoint temperature becomes activated at its learned daily time (but see Rule-5), or c) another learned weekly setpoint temperature becomes activated at its learned weekly time.

Rule-5—A weekly pattern overrides or supersedes a daily pattern if their assigned timestamps 48 are within a predetermined period of each other such as, for example, within three hours of each other based on the Y-values of their timestamps.

Rule-6—If a user enters a manually entered setpoint temperature, thermostat 10 controls unit 26 in response to the manually entered setpoint temperature and continues to do so until interrupted by one of the following: a) the user enters another manually entered setpoint temperature (adjusts the temp), b) a learned daily setpoint temperature becomes activated at its learned daily time, or c) a learned weekly setpoint temperature becomes activated at its learned weekly time.

Rule-7—If a user enters two manually entered setpoint temperatures within a predetermined short period of each other, e.g., within 90 minutes of each other, the first of the two manual entries is disregarded as being erroneous and is not to be considered as part of any learned pattern.

Rule-8—If a learned daily setpoint temperature is activated at a learned time and is soon interrupted by the user entering a manually entered setpoint temperature within a predetermined short period (e.g., within 3 hours), and this occurs a predetermined number of days in a row (e.g., 3 days in a row as indicated by the X-value of timer 38), then the daily pattern associated with the learned daily setpoint temperature is erased from the memory.

Rule-9—If a learned weekly setpoint temperature is activated at a learned time and is soon interrupted by the user entering a manually entered setpoint temperature within a predetermined short period (e.g., within 3 hours), and this occurs a predetermined number of weeks in a row (e.g., 2 weeks in a row as indicated by an additional counter that counts the cycles of the X-value of timer 38), then the weekly pattern associated with the learned weekly setpoint temperature is erased from the memory.

Rule-10—Actuating switch 34 between cool and heat or actuating some other manual input can be used for erasing the entire collection of learned data.

Rules 1-10 might be summarized more concisely but perhaps less accurately as follows:

1) Assign timestamps 48 to every manually entered setpoint temperature.

2) Identify daily patterns (similar manually entered temperatures and times 3 days in a row), and identify weekly patterns (3 similar manually entered temperatures and times each spaced a week apart). Based on those patterns, establish learned setpoint temperatures and learned times.

3) Activate learned daily setpoints at learned times, and keep them active until the activated setpoint is overridden by the next learned setpoint or interrupted by a manually entered setpoint.

4) Activate learned weekly setpoints at learned times, and keep them active until the activated setpoint is overridden by the next learned setpoint or interrupted by a manually entered setpoint.

5) If a learned weekly setpoint and a learned daily setpoint are set to occur near the same time on given day, the learned daily setpoint is ignored on that day because the day is probably a Saturday or Sunday.

6) Whenever the user manually adjusts the temperature, the manually entered setpoint temperature always overrides the currently active setting. The manually entered setpoint remains active until it is interrupted by a subsequent manual or learned setting.

7) If a user repeatedly tweaks or adjusts the temperature within a short period, only the last manually entered setpoint temperature is used for learning purposes, as the other settings are assumed to be trial-and-error mistakes by the user.

8) If a user has to repeatedly correct a learned daily setpoint (e.g., correct it 3 days in a row), that learned setpoint is deleted and no longer used. Using 3 days as the cutoff avoids deleting a good daily pattern due to 2 days of corrections over a weekend.

9) If a user has to repeatedly correct a learned weekly setpoint (e.g., correct it 2 weeks in a row), that learned setpoint is deleted and no longer used.

10) Switching between heating and cooling, for at least 5 seconds or so, deletes the entire collection of learned data.

To execute one or more of the aforementioned rules, microprocessor 36 could operate under the control of various algorithms, such as, for example, an algorithm 40 of FIG. 2, an algorithm 42 of FIG. 3, a combination of algorithms 40 and 42, or another algorithm altogether.

Referring to the example of FIG. 2, a block 44 represents receiving a plurality of manual setpoints 14 that are manually entered at various points in time over a period, each of the manual setpoints 14 provides a manually entered setpoint temperature 16 that in block 46 becomes associated with a timestamp 48 via timer 38. Timer 38 can run independently or irrespective of the actual time of day and irrespective of the actual day of the week. In blocks 50 and 52, thermostat 10 controls unit 26 as a function of a differential between the actual zone temperature 20 and a currently active manually entered setpoint. In block 54, microprocessor 36 recognizes patterns with the manually entered setpoints. Based on the patterns, in block 56 microprocessor 10 establishes learned setpoint temperatures and corresponding learned times. In block 58, some time after controlling unit 26 in response to the manually entered setpoint temperatures (block 50), automatically switching at the learned time to controlling the temperature conditioning unit in response to the learned setpoint temperature. This might continue until interrupted by block 60, wherein microprocessor 36 encounters another recognized pattern or upon receiving another manual setpoint, at which point unit 26 is controlled in response thereto.

Referring to the example of FIG. 3, a block 62 represents microprocessor 36 receiving temperature feedback signal 20 from temperature sensor 22. Sensor 22 could be incorporated within thermostat 10, as shown in FIG. 1, or sensor 22 could be installed at some other location to sense the room temperature such as the temperature of air 28 entering unit 26. Blocks 64, 66 and 68 represent microprocessor 36 sequentially receiving first, second and third manually entered setpoint temperatures. Blocks 70, 72 and 74 represent thermostat 10 controlling unit 26 at sequential periods in response to a differential between the comfort zone temperature and the various manually entered setpoint temperatures. Block 76 represents assigning timestamps 48 to the various manually entered setpoint temperatures. A block 78 represents microprocessor 36 identifying a learned setpoint temperature based on the first, second and third manually entered setpoint temperatures. In block 80, thermostat 10 controls unit 26 in response to a differential between the learned setpoint temperature and the actual zone temperature. Block 82 represents subsequently receiving a fourth manually entered setpoint temperature. Block 84 represents controlling unit 26 in response to the fourth manually entered setpoint temperature. Some time after that, thermostat 10 returns to controlling unit 26 in response to the learned setpoint temperature, as indicated by block 86.

Although the invention is described with respect to a preferred embodiment, modifications thereto will be apparent to those of ordinary skill in the art. The scope of the invention, therefore, is to be determined by reference to the following claims:

The invention claimed is:

1. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 24-hour timer and all lie within a predetermined range of each other based on the 24-hour timer.

2. The thermostat method of claim 1, wherein first manually entered setpoint temperature, the second manually entered setpoint temperature, and third manually entered setpoint temperature all lie within 5° F. of each other.

3. The thermostat method of claim 1, further comprising:

after controlling the temperature conditioning unit in response to the learned setpoint temperature, receiving a fourth manually entered setpoint temperature; and after receiving the fourth manually entered setpoint temperature, controlling the temperature conditioning unit in response to the fourth manually entered setpoint temperature.

4. The thermostat method of claim 3, further comprising:

after controlling the temperature conditioning unit in response to the fourth manually entered setpoint temperature, returning to controlling the temperature conditioning unit in response to the learned setpoint temperature.

5. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 168-hour timer *and all lie within a predetermined range of each other based on the 168-hour timer.*

*6. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature; and*

*wherein the first timestamp, the second timestamp, and the third timestamp are based on a daily pattern and all lie within a predetermined range of each other based on the daily pattern; and*

*wherein the first timestamp, the second timestamp, and the third timestamp all lie within 90 minutes of each other based on the daily pattern.*

*7. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a daily pattern and all lie within a predetermined range of each other based on the daily pattern; and*

*wherein the controlling step controls the temperature conditioning unit in response to the learned setpoint temperature at a learned setpoint time, wherein the learned setpoint time is based on the first timestamp, the second timestamp, and/or the third timestamp on the daily pattern.*

*8. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a daily pattern and all lie within a predetermined range of each other based on the daily pattern; and*

*wherein the controlling step controls the temperature conditioning unit in response to the learned setpoint temperature at a learned setpoint time, wherein the learned setpoint time is set before the first timestamp, the second timestamp, and the third timestamp on the daily pattern.*

*9. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on an average of the first manually entered setpoint temperature, the second manually entered setpoint temperature and the third manually entered setpoint temperature;*

*controlling the temperature conditioning unit in response to the learned setpoint temperature; and*

*wherein the first timestamp, the second timestamp, and the third timestamp all lie within a predetermined range of each other based on a daily pattern.*

*10. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and/or the third manually entered setpoint temperature if the first manually entered setpoint temperature, the second manually entered setpoint temperature, and the third manually entered setpoint temperature all fall within a temperature range that is less than 5 degrees F.;*

*controlling the temperature conditioning unit in response to the learned setpoint temperature; and*

*wherein the first timestamp, the second timestamp, and the third timestamp all lie within a predetermined range of each other based on a daily pattern.*

*11. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a weekly pattern and all lie within a predetermined range of each other based on the weekly pattern; and*

*wherein the first timestamp, the second timestamp, and the third timestamp all lie within 90 minutes of each other based on the weekly pattern.*

*12. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a weekly pattern and all lie within a predetermined range of each other based on the weekly pattern; and*

*wherein the controlling step controls the temperature conditioning unit in response to the learned setpoint temperature at a learned setpoint time, wherein the learned setpoint time is based on the first timestamp, the second timestamp, and/or the third timestamp on the weekly pattern.*

*13. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a weekly pattern and all lie within a predetermined range of each other based on the weekly pattern; and*

*wherein the controlling step controls the temperature conditioning unit in response to the learned setpoint temperature at a learned setpoint time, wherein the learned setpoint time is set before the first timestamp, the second timestamp, and the third timestamp on the weekly pattern.*

*14. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature and the third manually entered setpoint temperature;*

*controlling the temperature conditioning unit in response to the learned setpoint temperature; and*

*wherein the first timestamp, the second timestamp, and the third timestamp all lie within a predetermined range of each other based on a weekly pattern.*

*15. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on an average of the first manually entered setpoint temperature, the second manually entered setpoint temperature and the third manually entered setpoint temperature;*

*controlling the temperature conditioning unit in response to the learned setpoint temperature; and*

*wherein the first timestamp, the second timestamp, and the third timestamp all lie within a predetermined range of each other based on a weekly pattern.*

*16. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and third manually entered setpoint temperature;*

*controlling the temperature conditioning unit in response to the learned setpoint temperature;*

*wherein the first timestamp, the second timestamp, and the third timestamp are based on a weekly pattern and all lie within a predetermined range of each other based on the weekly pattern; and*

*wherein the identifying step identifies a learned setpoint temperature when the first manually entered setpoint temperature, the second manually entered setpoint temperature, and third manually entered setpoint temperature are within a predetermined deviation from one another.*

*17. A method for a temperature controller, wherein the temperature controller helps control a temperature conditioning unit of a comfort zone, the method comprising:*

*receiving a first manually entered setpoint temperature, which is assigned a first timestamp;*

*controlling the temperature conditioning unit in response to the first manually entered setpoint temperature;*

*receiving a second manually entered setpoint temperature, which is assigned a second timestamp;*

*controlling the temperature conditioning unit in response to the second manually entered setpoint temperature;*

*receiving a third manually entered setpoint temperature, which is assigned a third timestamp;*

*controlling the temperature conditioning unit in response to the third manually entered setpoint temperature;*

*identifying a learned setpoint temperature based on the first manually entered setpoint temperature, the second manually entered setpoint temperature, and/or the third manually entered setpoint temperature if the first manually entered setpoint temperature, the second manually entered setpoint temperature, and the third manually entered setpoint temperature all fall within a temperature range that is less than 5 degrees F.;*

*controlling the temperature conditioning unit in response to the learned setpoint temperature; and*

*wherein the first timestamp, the second timestamp, and the third timestamp all lie within a predetermined range of each other based on a weekly pattern.*

* * * * *